Patented May 31, 1949

2,471,994

UNITED STATES PATENT OFFICE 2,471,994

PYROLYSIS OF BETA-OXIMINO-TERT.-BUTYL PYRIDINIUM CHLORIDE

Charles B. Wooster, Philadelphia, Pa., assignor to Rohm & Haas Company, Philadelphia, Pa., a corporation of Delaware No Drawing. Application December 18, 1947, Serial No. 792,593

1 Claim. (Cl. 260—465.9)

This invention deals with a method for preparing methacrylonitrile. The process involves making a quaternary ammonium salt by the reaction of pyridine and the dimer formed by the addition of equimolecular proportions of nitrosyl chloride and isobutene and pyrolysing the quaternary ammonium salt. From the pyrolysis products there are obtainable methacrylonitrile, frequently with varying proportions of methacrolein oxime, which latter, if desired, may be dehydrated to methacrylonitrile in a subsequent operation. Otherwise, the two products, when obtained together, may be separated and used as such for any of their various applications.

The dimeric addition product is formed by reacting nitrosyl chloride and isobutene, 2-methyl propene, at temperatures of about 30° C. down to −15° C. or even lower. The addition reaction may be effected directly or in solvent, light cuts of petroleum, chloroform, chlorobenzene, and the like being suitable solvents. A white solid is formed along with some blue liquid. The solid is readily separable and may be rinsed free of any blue liquid adhering to it by means of petroleum ether or other volatile solvent. The solid then corresponds by analysis to the dimeric addition product of equimolecular proportions of nitrosyl chloride and isobutene.

A monomeric quaternary ammonium salt is formed by mixing and reacting the dimeric addition product and pyridine. The composition of this salt corresponds to that of beta-oximino-tert.-butyl-pyridinium chloride,

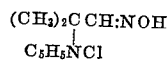

To complete the reaction, the mixture may be heated up to 115° C. The quaternary salt separates as a white solid.

Thus, 30 parts by weight of the dimeric addition product was added to 200 parts of pyridine. The mixture was stirred and heated at 50° C. A white solid was precipitated. It was separated, washed with petroleum ether, and dried. The yield was 47 parts. Analysis of this product gave a nitrogen content of 13.97% and a chlorine content of 17.71%. The corresponding theoretical values are 13.90% and 17.59%, respectively. This new salt is soluble in water, methanol, and aniline, but insoluble in pyridine, ether, petroleum ether, and chloroform. It melts with decomposition at 180°–182° C.

When the pyridinium chloride is heated at temperatures from about 175° C. to 250° C., decomposition occurs. Slow decomposition may begin below 175° C., particularly in the case of impure salt. Decomposition proceeds smoothly at 180° C. to 200° C.

A batch of 100 parts by weight of beta-oximino-tert.-butyl pyridinium chloride was placed in a distilling flask in an oil bath. Evidence of decomposition was noted when the bath was heated to 175° C. The temperature of the bath was raised to 190° C. A colorless liquid slowly distilled from the flask and was condensed. This liquid was fractionated into three parts. The first, dried over sodium sulfate, was obtained mainly at 90° C. and consisted of methacrylonitrile. A small intermediate fraction was then taken off between 90° C. and 125° C. It separated into an aqueous and non-aqueous layer, from which additional products were recoverable. The third fraction was taken off above 125° C. with most of the material distilling at 145° C. This fraction was practically pure methacrolein oxime.

The residue from the pyrolysis was found to be pyridine hydrochloride, melting at 82° C.

In another procedure for making pyridinium chloride there were taken 238 grams of pyridine which was mixed with 700 ml. of benzene in a two-liter, three-necked flask equipped with mechanical stirrer, reflux condenser, and funnel for the adding of material. The mixture was warmed to 50° C. and 243 grams of the dimeric addition product from isobutene and nitrosyl chloride added in successive portions during the course of an hour. External cooling was used to prevent the temperature rising much above 50° C. The reaction mixture was then stirred for an hour while the temperature thereof was held at 50° C. The pyridinium salt crystallized out and was separated by filtration. The weight of the dried salt was 387 grams, corresponding to a yield of 96.5%.

A portion of 50 grams of the above-prepared beta-oximino-tert.-butyl pyridinium chloride was placed in a glass flask fitted with stirrer, still head, and funnel for adding this pyridinium chloride. The flask was then heated to 190° C.

Vapors passed from the still head into a condenser, the gases therefrom were passed through a trap chilled with dry ice. During the course of an hour 250 grams of additional beta-oximino-tert.-butyl pyridinium chloride was added in small increments. The temperature was gradually increased to 220° C. From the liquid collected water was separated and the organic layer was fractionated. There was thus obtained a yield of 59.4% of methacrylonitrile.

I claim:

A process for preparing methacrylonitrile which comprises reacting at 50° C. pyridine and the dimer formed by the addition of equimolecular proportions of nitrosyl chloride and isobutene, thereby forming beta-oximino-tert.-butyl pyridinium chloride, separating said pyridinium chloride, heating it at 175° C. to 250° C., thereby forming methacrylonitrile, and separating methacrylonitrile from the heated pyridinium chloride.

CHARLES B. WOOSTER.

REFERENCES CITED

The following references are of record in the file of this patent:

UNITED STATES PATENTS

| Number | Name | Date |
|---|---|---|
| 2,234,566 | Lazier et al. | Mar. 11, 1941 |
| 2,328,984 | Lichty | Sept. 7, 1943 |
| 2,375,005 | Kung | May 1, 1945 |
| 2,385,550 | Spence | Sept. 25, 1945 |
| 2,394,430 | Crowder et al. | Feb. 5, 1946 |
| 2,404,280 | Dutcher | July 16, 1946 |
| 2,417,024 | Tuerck et al. | Mar. 4, 1947 |